United States Patent [19]

Mistry

[11] Patent Number: 5,922,135
[45] Date of Patent: Jul. 13, 1999

[54] METHOD OF REMOVING RESIDUAL WAX FROM SILICON WAFER POLISHING PLATE

[75] Inventor: Jayesh Natvarlal Mistry, Camas, Wash.

[73] Assignee: SEH America, Inc., Vancouver, Wash.

[21] Appl. No.: 09/148,350

[22] Filed: Sep. 4, 1998

[51] Int. Cl.⁶ ............................. B08B 1/00; B08B 3/12; C09K 13/02; C23G 1/14
[52] U.S. Cl. ..................... 134/1; 134/2; 134/1.3; 134/5; 134/29; 134/40; 134/25.4; 252/79.5
[58] Field of Search ............................. 134/1, 2, 1.3, 5, 134/29, 40, 25.4; 252/79.5

[56] References Cited

U.S. PATENT DOCUMENTS

| | | | |
|---|---|---|---|
| 4,721,549 | 1/1988 | Bogenschütz et al. | 156/663 |
| 4,867,843 | 9/1989 | Ikeda et al. | 156/651 |
| 5,209,785 | 5/1993 | Brewe et al. | 134/40 |
| 5,350,487 | 9/1994 | Ameen et al. | 156/642 |

FOREIGN PATENT DOCUMENTS

0628992A2  12/1994  European Pat. Off. .

*Primary Examiner*—Zeinab El-Arini
*Attorney, Agent, or Firm*—Douglas G. Anderson; Timothy H Courson

[57] ABSTRACT

A process for removing waxes from silicon wafer polishing plates is provided. The process includes the steps of providing submersion baths of an alkali soap, de-ionized rinse water, sodium hydroxide, and additional de-ionized rinse water, in which polishing plates are exposed. The process eliminates the use of methylene chloride from the process.

22 Claims, No Drawings

METHOD OF REMOVING RESIDUAL WAX FROM SILICON WAFER POLISHING PLATE

BACKGROUND OF THE INVENTION

The present invention generally relates to the field of manufacturing silicon wafers in the microelectronics industry. More particularly, it relates to a method of removing residual wax from a silicon wafer polishing plate.

Silicon wafer polishing is one of the important steps of manufacturing silicon wafers in the microelectronics industry. In the process of polishing silicon wafers, wax is used to attach the silicon wafers to a single glass or ceramic (aluminum oxide) plate. After the wafers are attached, the plate is inserted into a polishing machine which applies pressure and rotation to the plate in an environment of liquid slurry. The combination effect of the pressure, rotation, and slurry improves the flatness and smoothness of the silicon wafers.

After the silicon wafer polishing process is completed, the polishing plate is removed from the polishing machine, and the wafers are removed from the polishing plate. The polishing plate can be reused, provided the residual wax is completely removed. If residual wax remains on the polishing plate, the surface of the polishing plate will not be flat enough to properly polish the next batch of wafers. In this regard, wafers must generally be polished to a relatively tight flatness specification, such as to within one micron. Accordingly, any residual wax on the polishing plate will create a non-flat surface which, in turn, may prevent the next batch of wafers from being polished to within tolerance.

It is therefore essential to completely remove all residual wax from the polishing plate before new wax is applied and unpolished wafers are attached to it. However, it is difficult to completely remove all residual wax from the polishing plate because wax collects in the contours of the plate, and particularly on the surface areas where the wafer perimeters contact the polishing plate.

Referring to TABLE 1, which is set forth below, the conventional method of removing residual wax from the polishing plate typically includes the following seven steps: The first step involves a single rinse of the plate with methylene chloride ($CH_2Cl_2$). The next three steps involve consecutive submersions of the plate in a surfactant commonly known as RBS-35 (a proprietary surfactant manufactured by Pierce Chemical Co. in Rockford, Ill.). These steps are followed by three consecutive rinses of the plate in de-ionized (DI) water, all in combination with ultrasonic energy and heating. The temperature range for each bath is approximately 25° C. to 70° C. The time range for each bath is approximately 0.5 to 5 minutes.

TABLE 1

CONVENTIONAL METHOD OF WAX REMOVAL

| Step | Treatment | Material |
|------|-----------|----------|
| 1 | Rinse | $CH_2Cl_2$ |
| 2 | Submerge | Surfactant (RBS-35) |
| 3 | Submerge | Surfactant (RBS-35) |
| 4 | Submerge | Surfactant (RBS-35) |
| 5 | Rinse | DI Water |
| 6 | Rinse | DI Water |
| 7 | Rinse | DI Water |

The primary disadvantage of the conventional method of removing residual wax from silicon wafer polishing plates is that it uses methylene chloride, which is environmentally hazardous, carcinogenic, and expensive to contain and dispose. It is therefore desirable to provide a new method for the effective removal of residual wax from glass or ceramic silicon wafer polishing plates which uses environmentally safe and low cost chemical materials.

SUMMARY OF THE INVENTION

It is an object of the present invention to provide a dewaxing method for solving the above-discussed problems, and particularly, to provide a method of removing residual wax from silicon wafer polishing plates without using methylene chloride. The invention described herein provides a process for removing waxes from the surface of silicon wafer polishing plates. The process of the present invention replaces methylene chloride with sodium hydroxide (NaOH) as the wax removing agent, adds an alkali soap bath, and eliminates the use of the surfactant. As a result, the process: (1) reduces the health risks associated with the use of methylene chloride, and (2) provides an environmentally safe process. It also reduces the chemical cost and waste disposal cost associated with the use of methylene chloride. In addition, the process of the present invention increases the lifetime of the silicon wafer polishing plate.

Further benefits and advantages of the invention will become apparent from a consideration of the following detailed description, which specifies and shows a preferred embodiment of the present invention.

DETAILED DESCRIPTION OF THE INVENTION

The method of the present invention described herein provides a process for removing waxes from the surface of glass, ceramic, or other silicon wafer polishing plates. The steps of this method are summarized in TABLE 2 which is set forth below. According to the process shown in TABLE 2, silicon wafer polishing plates are first subjected to bath 1 containing an alkali soap in de-ionized water, such that the bath mixture contains between 1% and 10% of alkali soap by volume. As the plates are introduced to the bath, a mechanical brush scrubs the side of the plate containing the wax. The temperature of the bath is preferably between 25° C. and 95° C., and the plates are submerged for between 20 and 60 seconds. One commercially available alkali soap is commonly known as DEVEL, manufactured by Nikka-Seiko Company, of Japan. The polishing plates are then submerged in bath 2, containing de-ionized water at ambient room temperature for between 20 and 60 seconds. The polishing plates are then sequentially submerged in baths 3 and 4 containing between 1% and 10% sodium hydroxide by volume in de-ionized water at between 25° C. and 95° C. for between 20 and 60 seconds. The polishing plates then proceed sequentially through baths 5, 6, 7, and 8, all of which contain de-ionized water heated to between 25° C. and 95° C. for between 20 and 60 seconds in each bath. The plates are then removed from bath 8 and allowed to partially drip dry.

TABLE 2

PRESENT INVENTION METHOD OF WAX REMOVAL

| Step | Treatment | Material |
|------|-----------|----------|
| 1 | Brush and Submerge | Alkali Soap |
| 2 | Submerge | DI Water |
| 3 | Submerge | NaOH |
| 4 | Submerge | NaOH |
| 5 | Submerge | DI Water |
| 6 | Submerge | DI Water |
| 7 | Submerge | DI Water |
| 8 | Submerge | DI Water |

The method of the present invention will be further clarified by consideration of the following example, which is intended to be purely exemplary of the invention.

EXAMPLE

A glass polishing plate with residual wax on one side of the plate was submerged in bath #1, containing a 5% by volume solution of DEVEL alkali soap in de-ionized water. The plate was rotated in a clockwise direction, and a nylon brush rotated and agitated against the wax-containing surface in a counterclockwise direction. Bath #1 was heated to 50° C., with the plate submerged in this solution for 30 seconds. The plate was then transferred to bath #2, wherein the plate was spray-rinsed with de-ionized water at ambient room temperature for 30 seconds. The plate was then sequentially transferred to bath #3 and bath #4, wherein it was subjected to a solution of 1% by volume of sodium hydroxide in de-ionized water heated to 50° C. for 30 seconds. Each bath had a slow vertical agitation of 5 cycles per minute with an amplitude of 25 millimeters. Ultrasonic energy was applied to each bath at 5 amps and 40 kHz. The plate was then transferred to bath #5 and was subjected to a spray-rinse with de-ionized water at ambient room temperature for 30 seconds. The plate was then transferred to bath #6 wherein it was submerged in de-ionized water heated to 70° C. for 30 seconds, followed by a submersion in bath #7 in de-ionized water heated to 80° C. for 30 seconds, and finally submerged in bath #8 in de-ionized water heated to 80° C. for 30 seconds. Each of baths #6, #7, and #8 provided vertical agitation at 5 cycles per minute with an amplitude of 25 millimeters, and each bath provided ultrasonic energy at 5 amps with a frequency of 40 kHz. The plate was then removed from bath #8 and allowed to drip dry for one minute. The result provided a glass polishing plate for silicon wafers that was free of residual wax, and ready to be used for another polishing cycle.

Other embodiments of the present invention will be apparent to those skilled in the art from a consideration of this specification or practice of the invention disclosed herein. It is intended that the specification and example be considered in all aspects only as illustrative and not restrictive. The scope of the invention is, therefore, indicated by the appended claims rather than by the foregoing description. All changes which come within the meaning and range of the equivalence of the claims are to be embraced within their scope.

What is claimed is:

1. A process for removing wax from a surface of a silicon wafer polishing plate while maintaining smoothness of said surface, comprising the steps of:
    a) providing sodium hydroxide;
    b) heating said sodium hydroxide to a temperature within a range of approximately 25° C. to 70° C.; and
    c) exposing said polishing plate to said sodium hydroxide for liquefying said wax such that said wax can be removed without exposing said polishing plate to methylene chloride.

2. The process of claim 1, wherein said polishing plate is a glass polishing plate.

3. The process of claim 1, wherein said polishing plate is a ceramic polishing plate.

4. The process of claim 1, further comprising additional steps of repeating steps a through c for further liquefying said wax.

5. The process of claim 1, wherein said heating step comprises heating said sodium hydroxide to a temperature of approximately 50° C.

6. The process of claim 1, wherein said providing step comprises providing sodium hydroxide which has a concentration of approximately 0.5% to 10% by volume.

7. The process of claim 6, wherein said providing step further comprises providing sodium hydroxide having a concentration of about 1%.

8. The process of claim 1, further comprising a step of applying ultrasonic energy or mechanical agitation to said sodium hydroxide during said exposing step.

9. The process of claim 1, wherein said exposing step comprises exposing said polishing plate to said sodium hydroxide for a time within a range of about 0.5 to 5 minutes.

10. A process for removing wax from a surface of a wafer polishing plate while maintaining smoothness of said surface, comprising the steps of:
    a. exposing said polishing plate to an alkali soap;
    b. heating sodium hydroxide to a temperature within a range of approximately 25° C. to 70° C.; and
    c. thereafter exposing said polishing plate to sodium hydroxide to thereby liquefy said wax.

11. The process of claim 10, wherein said polishing plate is a glass polishing plate.

12. The process of claim 10, wherein said polishing plate is a ceramic polishing plate.

13. The process of claim 10, further comprising an additional step of repeating step c for further liquefying said wax.

14. The process of claim 10, wherein said step of exposing said polishing plate to sodium hydroxide comprises exposing said polishing plate to said sodium hydroxide for a time within a range of about 0.5 to 5 minutes.

15. The process of claim 10, wherein said step of exposing said polishing plate to sodium hydroxide comprises exposing said polishing plate to sodium hydroxide having a concentration of approximately 0.5% to 10%.

16. The process of claim 10, further comprising a step of applying ultrasonic energy or mechanical agitation to said sodium hydroxide during said step of exposing said polishing plate to sodium hydroxide.

17. The process of claim 10, wherein said step of exposing said polishing plate to alkali soap comprises exposing said polishing plate to alkali soap having a concentration of between 1% and 20%.

18. The process of claim 10, further comprising the step of heating said alkali soap to a temperature within a range of between 20° C. and 70° C. prior to exposing said polishing plate to said alkali soap.

19. The process of claim 10, wherein said step of exposing said polishing plate to alkali soap comprises exposing said polishing plate to said alkali soap for a time within a range of about 0.5 to 5 minutes.

20. The process of claim 10, further comprising a step of applying ultrasonic energy or mechanical agitation to said alkali soap during said step of exposing said polishing plate to alkali soap.

21. The process of claim 10, further comprising the step of repeatedly exposing said polishing plate to deionized water following said step of exposing said polishing plate to sodium hydroxide.

22. The process of claim 10, further comprising the step of exposing said polishing plate to deionized water between the steps of exposing said polishing plate to alkali soap and sodium hydroxide.

* * * * *